United States Patent [19]

Löhmann et al.

[11] Patent Number: 4,819,995
[45] Date of Patent: Apr. 11, 1989

[54] CONTROL SYSTEM FOR VEHICLE ANTI-LOCKING BRAKE SYSTEM AND DRIVE TRACTION REGULATION SYSTEM

[75] Inventors: Berthold Löhmann, Hanover; Erwin Petersen, Wunstorf, both of Fed. Rep. of Germany

[73] Assignee: Wabco Westinghouse Fahrzeugbremsen GmbH, Hanover, Fed. Rep. of Germany

[21] Appl. No.: 141,795

[22] Filed: Jan. 11, 1988

[30] Foreign Application Priority Data

Jan. 13, 1987 [DE] Fed. Rep. of Germany ....... 3700716

[51] Int. Cl.⁴ .............................................. B60T 8/40
[52] U.S. Cl. ..................................... 303/110; 180/197; 303/100
[58] Field of Search .................. 180/197; 303/93, 100, 303/103, 110, 111

[56] References Cited

U.S. PATENT DOCUMENTS

| | | | |
|---|---|---|---|
| 4,565,411 | 1/1986 | Seiber | 303/110 |
| 4,576,417 | 3/1986 | Dobner | 303/110 X |
| 4,662,687 | 5/1987 | Leiber | 303/110 |
| 4,740,041 | 4/1988 | Pannbacker | 303/110 X |

FOREIGN PATENT DOCUMENTS 0233499 8/1987 European Pat. Off. ........... 303/110

Primary Examiner—Duane A. Reger
Attorney, Agent, or Firm—J. O. Ray, Jr.

[57] ABSTRACT

A motor vehicle having an anti-locking brake system and a drive traction regulation system. The vehicle has one drive axle and a non-driven front or rear axle and is equipped with a preferably four-channel ABS/ASR electronic system. The invention provides between the brake cylinders of the drive axle and the front or rear axle a double check valve on each side. Both double check valves are activated together by one brake line. This arrangement prevents the non-driven wheels of the front or rear axle from being braked undesirably when the drive traction regulation system of the driven wheels is in operation.

7 Claims, 3 Drawing Sheets

CONTROL SYSTEM FOR VEHICLE ANTI-LOCKING BRAKE SYSTEM AND DRIVE TRACTION REGULATION SYSTEM

FIELD OF THE INVENTION

The present invention relates, in general, to motor vehicle control systems and, more particularly, this invention relates to a control system to control a three-axle motor vehicle anti-locking brake system (ABS) and a drive traction regulation system (ASR) with a four-channel ABS/ASR electronic system.

BACKGROUND OF THE INVENTION

A motor vehicle equipped with such anti-locking brake and drive traction regulation systems is described, for example, in the VDI Conference Report entitled "Elektronik im Kraftfahrzeug" ("Motor Vehicle Electronic Systems"), Oct. 9/10, 1986, the teachings of which are incorporated herein by reference thereto.

The primary purpose of anti-locking brake systems is to prevent undesirable locking of the braked wheels. As is well-known in the vehicle braking art, such systems are of particular use on slippery streets. Furthermore, these systems enhance the driver's capability of maintaining the steering ability of the vehicle. For this purpose, the braking torques are reduced during a time interval when a tendency to locking appears, and are subsequently increased again when such brake locking tendency disappears. To achieve this function, the activation of the brakes is controlled by a special electronic system. This electronic system is generally designed with four channels. That means that on a two-axle vehicle, for example, each individual wheel has its own electronic channel. For three-axle vehicles, six-channel electronic systems are customary, but such six-channel electronic systems are relatively complex and rather expensive. The primary reason for this is because of the relatively small quantities in which they are manufactured.

In addition to the anti-locking brake system, motor vehicle drive traction regulation systems are well-known in the vehicle. Such drive traction regulation systems prevent slipping of the drive wheels during the start-up and acceleration operating stages of the vehicle. This drive traction regulation system facilitates the start-up and improves the lateral traction of the motor vehicle during acceleration. Drive traction regulation systems are generally provided as an extension of an anti-locking braking system already installed on the motor vehicle and also incorporate the use of essential components of the anti-locking braking system, such as control valves, wheel sensors, and the electronic system.

It is customary in the operation of a drive traction regulation system to brake the wheel which slips first (low wheel), by activating the corresponding wheel brake to almost the speed of the vehicle. As a result of this "differential brake control", by means of the differential transmission, the torque of the motor is increasingly transmitted also to the second wheel running on a good road (high wheel). The motor vehicle can thus "support" itself on the high wheel and start up or accelerate as desired.

The above-mentioned braking of the low wheel is done when this wheel exceeds a specified velocity difference or traction slip, for example, about six percent. The brake on the low wheel is normally released when the values again drop below this specified threshold. A braking to less than the vehicle speed must naturally be avoided under any circumstances, as is understood by persons skilled in the braking art.

If the high wheel should also begin to slip, the output power of the motor is reduced by means of an automatic intervention in the throttle linkage of the vehicle. Such output power reduction of the motor occurs completely independently of any action on the part of the driver of the vehicle.

There is a problem, however, in addition to cost considerations, when a four-channel ABS/ASR electronic system is installed in a three-axle vehicle that is equipped to operate with one drive axle and a non-driven front or rear axle. This problem arises because there are no sensors for the wheels of one of the forward and rear axle.

In this arrangement, naturally, during a controlled start, the brake cylinders of the front or rear axle, the pressure of which is normally dependent on the brake cylinders of the drive axle, are not braked at the same time, since otherwise starting would be even more difficult.

One configuration in which a rear axle is coupled to the drive axle by means of a select-low valve is illustrated in FIG. 2 of German Patent No. DE-OS 31 01 731. Here, however, there is no ASR function performed.

SUMMARY OF THE INVENTION

On a motor vehicle equipped with an anti-locking brake system and a drive traction regulation system and which has one drive axle and a non-driven front or rear axle and which is equipped to be controlled by a four-channel ABS/ASR electronic system, the present invention provides between the brake cylinders of the drive axle and the front or rear axle a double check valve on each side. In this arrangement, the double check valves on each side are activated together by a common brake line. This arrangement prevents the non-driven wheels of the front or rear axle from being braked at an inappropriate time, such as, when the drive traction regulation system of the driven wheels is in operation.

OBJECTS OF THE INVENTION

It is, therefore, one of the primary objects of the present invention to provide a control system on a motor vehicle equipped with an anti-locking brake system and a drive traction regulation system which allows uncoupling the wheels of the front or rear axle in a simple manner from the wheels of the drive axle of such vehicle during a controlled start.

Another object of the present invention is to provide a control system on a motor vehicle equipped with an anti-locking brake system and a drive traction regulation system which during a controlled braking, the coupling on each side will remain intact so that the wheels of the front or rear axle can make their contribution to braking on such vehicle.

Still another object of the present invention is to provide a control system on a motor vehicle equipped with an anti-locking brake system and a drive traction regulation system which allows where possible, the contribution to the braking of such vehicle by the front or rear axle to exceed the action of a select-low braking.

In addition to the objects and advantages associated with the control system described above, various other objects and advantages of the present invention will become more readily apparent to those persons who are skilled in the motor vehicle braking art from the following more detailed description of the invention when such description is taken in conjunction with the attached drawings and with the appended claims.

BRIEF DESCRIPTION OF THE INVENTION

Figure 1:
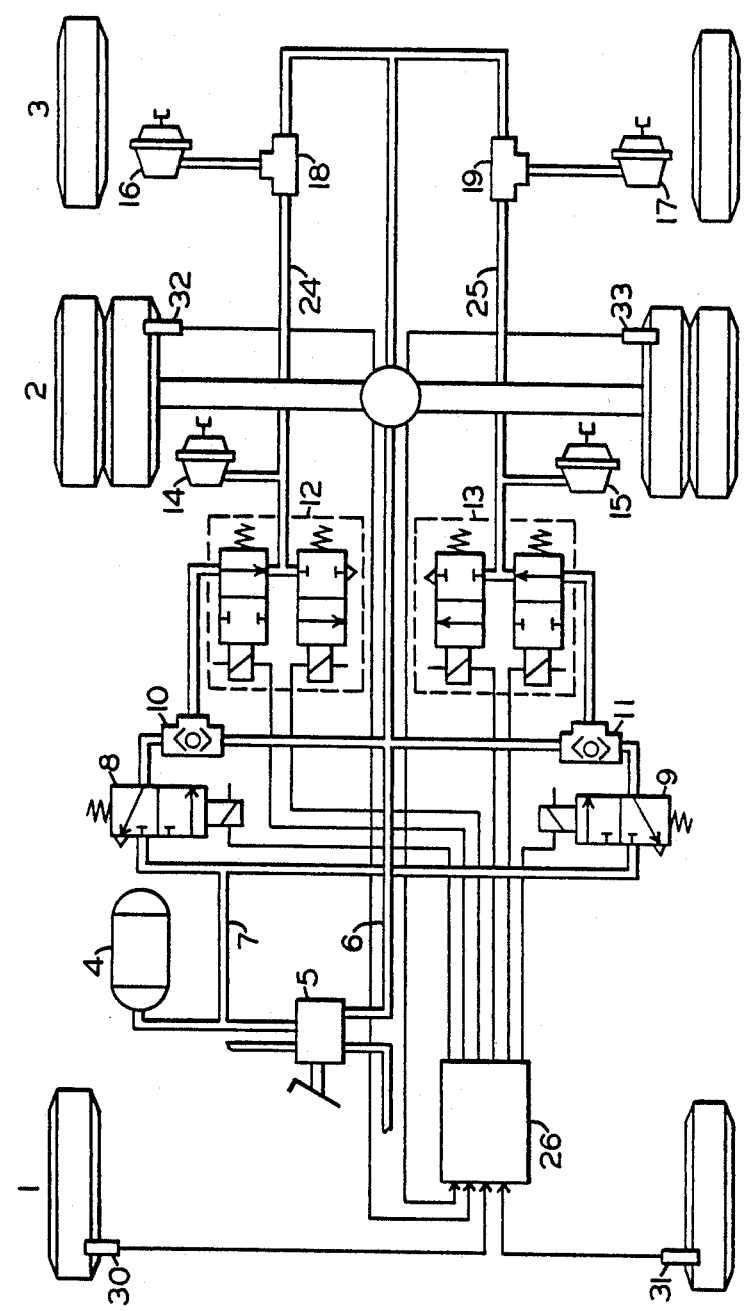
FIG. 1 schematically illustrates one presently preferred embodiment of a control system for an ABS/ASR system positioned on a motor vehicle according to the present invention.

Prior to proceeding to the detailed description of the present invention, it should be noted that identical components of the control system have been identified with identical reference numerals throughout the several views for the sake of clarity. Furthermore, various parts of the motor vehicle which are not essential to an understanding of the present invention have been omitted from such description since they form no part thereof.

Now refer more particularly to FIG. 1 which schematically illustrates the braking system and its associated control components as they are installed, for example, on a utility vehicle.

The particular motor vehicle illustrated therein has three distinct axles identified as 1, 2, and 3. The first of these three axles is steerable. The second of these axles is the drive axle, and the third of such axles is the rear axle. The wheels on axles 1 and 2 are sensed, i.e., equipped with sensors, identified as 30 to 33, to measure their speed of rotation. From the measured speeds of rotation of the sensed wheels, a 4-channel ABS/ASR electronic system 26 detects whether an undesirable slip is occurring on these wheels either during a braking phase or during a start-up phase of such motor vehicle. The electronic system 26 is also connected electrically with the differential brake valves 8 and 9 and the control valves 12 and 13.

The pneumatic portion of the illustrated brake system consists of an air reservoir 4 which is connected to a brake pedal valve 5, from which in turn compressed air can be fed via a brake line 6 to the brake cylinders 14 and 15 of the drive axle 2, and to the brake cylinders 16 and 17 of the rear axle 3. In this arrangement, the compressed air passes through two-way valves 10 and 11, each of which lets through the higher of the two pressures (select-high valves), and through ABS control valves 12 and 13, initially to the brake cylinders 14 and 15 of the driven axle 2.

Upstream of the brake cylinders 16 and 17 of the rear axle 3, which are normally switched parallel by vehicle sides to the brake cylinders 14 and 15, there is installed a double check valve identified as 18 and 19. The second inlet connection of the check valves 18 and 19 is connected to the brake line 6. The valves 18 and 19 each let pass the lower of the two pressures available at the inlets thereof (select-low valves).

By means of a direct line 7 bypassing the brake valve 5, the air reservoir 4 is also connected to the two differential brake valves 8 and 9. The output of the differential brake valves 8 and 9 is connected to the second input connection of the above-mentioned two-way valves 10 and 11.

The presently preferred operation of the ABS/ASR brake system, illustrated in FIG. 1, will now be explained in greater detail. In this operation, during an uncontrolled braking, the compressed air travels out of the reservoir 4 via the brake valve 5, the two-way valves 10 and 11 and the control valves 12 and 13 to the brake cylinders 14 and 15 jof the drive axle, and also via the lines 24 and 25 and the double check valves 18 and 19 to the brake cylinders 16 and 17 of the rear axle. In this case, the same air pressure prevails at both inputs of the double check valves 18 and 19. This air pressure, as explained in greater detail below (FIG. 2), is allowed to pass through at the same level. The control valves 12 and 13 are thereby in the (indicated) position to allow passage.

During a controlled braking, i.e., with an ABS system in operation, the sequence of the compressed air flow is basically as described above, but with one significant difference, namely, that now the control valves 12 and 13 are activated by the electronic system 26, i.e., as a function of the traction of the drive wheels, they are alternately opened and closed. As a result of this regulated brake pressure, the brake cylinders 16 and 17 of the rear axle 3 coordinated on each vehicle side are co-controlled by means of the lines 24 and 25. Since now, at the second input connections of the double check valves 18 and 19, which are connected with the brake line 6, the maximum brake pressure is always present, in this case they are switched so that an unhindered, side-wise connection of the brake cylinders is guaranteed. This guarantees that both the wheels of the drive axle 2 and the wheels of the rear axle 3 can make a contribution to the braking.

In an ASR start-up process, finally, one of the differential brake valves 8 and 9 is opened by means of the ABS/ASR electronic system. The compressed air can thereby flow out of the reservoir 4 via the line 7 through one of the two differential brake valves 8 or 9, as well as the neighboring two-way valve 10 or 11 and the connected control valve 12 or 13 to the brake cylinder 14 or 15 of the slipping wheel on the drive axle 2, and brake it.

In this case, naturally, the wheels coordinated by sides or their brake cylinders 16 and 17 need not be braked, since that would further interfere with the start-up process.

Since in this case the brake line 6 is depressurized, the double check valve 18 or 19 closes the corresponding connecting line 24 or 25, so that in the case of the ASR control, the co-control for each side of the vehicle is interrupted in the desired manner.

It should also be noted that this configuration makes it possible to brake only one drive wheel, or to brake both drive wheels during the drive traction regulation, without having to brake the non-driven wheels too. A two-sided braking can be advantageous in certain cases, for example, with automatic transmissions.

Figure 2:
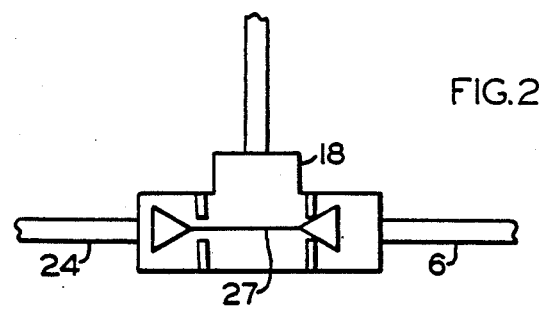
FIG. 2 illustrates details of one presently preferred valve means which can be used effectively in the ABS/ASR control scheme that is illustrated in FIG. 1.

FIG. 2 shows schematically the internal construction of the double check valve 18. By means of the higher of the two pressures at the input lines 6 or 24, a piston 27 is displaced so that only the lower pressure is allowed to pass toward the connected brake cylinder.

Figure 3:
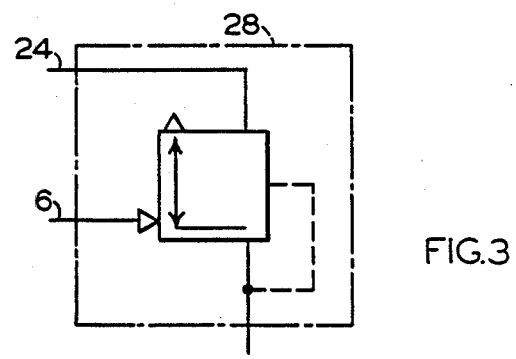
FIG. 3 illustrates details of an alternative valve means which can also be used in the ABS/ASR control scheme that is illustrated in FIG. 1.

Instead of the double check valves 18 and 19, the optional relay valve 28 shown in FIG. 3 can be used in the same circuit.

Relay valves are known as standard equipment in brake systems. Designed for a translation ratio of 1:1, the pressure applied at the reservoir connection or line 24 is forced up to the pressure present at the control connection or line 6 to the consumer connection. The pressure released can naturally not exceed the reservoir or supply pressure so that, as with the double check valve 18, the lower pressure supplied via the lines 6 and 4 also prevails at the consumer connection and thus in the brake cylinder of the driven wheel.

Relay valves are more complex and expensive than double check valves, but they may be preferable for reasons of equipment standardization.

It may also be advantageous to connect the brake line 6 to the reservoir connection and the line 24 to the control connection of the relay valve 28. Then, the ABS control valves 12 and 13 need only each supply the volume of one brake cylinder 14 or 15 and the corresponding relay valve control chamber.

Figure 4:
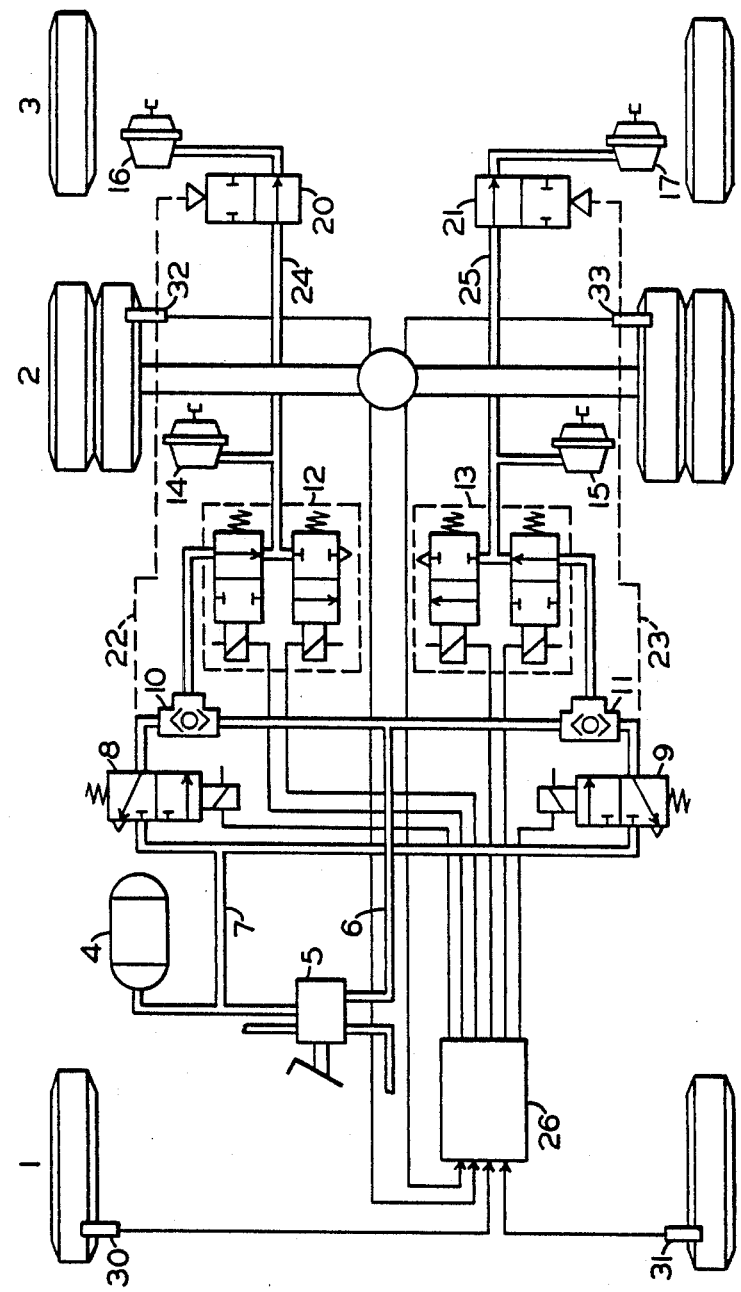
FIG. 4 schematically illustrates an alternative embodiment of a control system for an ABS/ASR system installed on a motor vehicle.

FIG. 4 shows a variant of the block diagram of FIG. 1. The only difference from FIG. 1 is that each sidewise connection of the brake cylinders in this case can be interrupted by means of a 2/2 or 3/2 way valve 20 and 21. These "check valves", as described above, can also be used to prevent the co-control of the brake cylinder 16 and 17 of the rear axle 3 in the case of an ASR-controlled starting procedure.

The activation of the check valves 20 and 21, as shown, is controlled via lines 22 and 23, which are connected side-wise to the outputs of the differential brake valves 8 and 9.

Optionally, a control of the check valves 20 and 21 can also naturally be achieved by means of an activation signal from the ABS/ASR electronic system 26. For this purpose, the check valves 20 and 21 must be designed as solenoid valves (not shown). The embodiment illustrated in FIG. 2 requires a somewhat higher degree of complexity and expense than the embodiment illustrated in FIG. 1.

While a number of different embodiments of the ABS/ASR motor vehicle control system of the present invention have been described in detail above, it should be obvious to persons skilled in the motor vehicle braking art that other modifications and adaptations of the control system of the present invention can be made without departing from the spirit and scope of the attached claims.

We claim:

1. A brake control system for a motor vehicle, said brake control system comprising:
   (a) an anti-locking brake means positioned on such motor vehicle for preventing a locking of a wheel during a brake application;
   (b) a drive traction regulation means positioned on such motor vehicle for preventing slippage of a wheel during a start-up process;
   (c) a plurality of speed sensing means positioned adjacent a plurality of wheels for determining a speed of rotation of a respective one of such plurality of wheels by a respective one of said plurality of speed sensing means;
   (d) a four-channel electronic system positioned on such motor vehicle and electrically connected to receive a signal from each one of said plurality of speed sensing means and electrically connected to each of said anti-locking brake means and said drive traction regulation means for providing appropriate control signals to said each of said anti-locking brake means and said drive traction regulation means respectively during a brake application and a start-up process respectively;
   (e) a source of fluid pressure positioned on such motor vehicle to provide a source of brake pressure during a brake application;
   (f) a plurality of brake cylinders positioned on such motor vehicle and connected to receive fluid pressure from said source of fluid pressure to brake a respective wheel associated with a respective one of said plurality of brake cylinders;
   (g) a double check valve connected intermediate said brake cylinders on each side of such motor vehicle and such source of fluid pressure, each said double check valve capable of being activated simultaneously by a common brake line; and
   (h) a brake application means connected intermediate said source of fluid pressure and said double check valve for initiating a brake application.

2. A brake control system for a motor vehicle, said brake control system comprising:
   (a) an anti-locking brake means positioned on such motor vehicle for preventing a locking of a wheel during a brake application;
   (b) a drive traction regulation means positioned on such motor vehicle for preventing slippage of a wheel during a start-up process;
   (c) a plurality of speed sensing means positioned adjacent a plurality of wheels for determining a speed of rotation of a respective one of such plurality of wheels by a respective one of said plurality of speed sensing means;
   (d) a four-channel electronic system positioned on such motor vehicle and electrically connected to receive a signal from each one of said plurality of speed sensing means and electrically connected to each of said anti-locking brake means and said drive traction regulation means for providing appropriate control signals to said each of said anti-locking brake means and said drive traction regulation means respectively during a brake application and a start-up process respectively;
   (e) a source of fluid pressure positioned on such motor vehicle to provide a source of brake pressure during a brake application;
   (f) a plurality of brake cylinders positioned on such motor vehicle and connected to receive fluid pressure from said source of fluid pressure to brake a respective wheel associated with a respective one of said plurality of brake cylinders;
   (g) a relay valve connected between said brake cylinders on each side of such motor vehicle, each said relay valve capable of being activated simultaneously by a common brake line; and
   (h) a brake application means connected intermediate said source of fluid pressure and said double check valve for initiating a brake application.

3. A brake control system for a motor vehicle, said brake control system comprising:
   (a) an anti-locking brake means positioned on such motor vehicle for preventing a locking of a wheel during a brake application;

(b) a drive traction regulation means positioned on such motor vehicle for preventing slippage of a wheel during a start-up process;

(c) a plurality of speed sensing means positioned adjacent a plurality of wheels for determining a speed of rotation of a respective one of such plurality of wheels by a respective one of said plurality of speed sensing means;

(d) a four-channel electronic system positioned on such motor vehicle and electrically connected to receive a signal from each one of said plurality of speed sensing means and electrically connected to each of said anti-locking brake means and said drive traction regulation means for providing appropriate control signals to said each of said anti-locking brake means and said drive traction regulation means respectively during a brake applicaiton and a start-up process respectively;

(e) a source of fluid pressure positioned on such motor vehicle to provide a source of brake pressure during a brake application;

(f) a plurality of brake cylinders positioned on such motor vehicle and connected to receive fluid pressure from said source of fluid pressure to brake a respective wheel associated with a respective one of said plurality of brake cylinders;

(g) a check valve connected in each brake line leading to said brake cylinders; and (h) a brake application means connected intermediate said source of fluid pressure and said double check valve for initiating a brake application.

4. A control system, according to claim 3, wherein said check valve is electrically controlled.

5. A control system, according to claim 3, wherein said check valve is pneumatically controlled.

6. A control system, according to claim 5, wherein pneumatic activation of said pneumatically controlled brake valve is accomplished via air lines which lead to an output connection of differential brake valves.

7. A control system, according to claim 4, wherein electronic activation of said electrically controlled check valve is accomplished by said electronic system.

* * * * *